United States Patent Office 2,990,283
Patented June 27, 1961

2,990,283
GROWTH PROMOTING COMPOSITION
Peter C. Hereld, Bergenfield, N.J., assignor, by mesne assignments, to Polychemical Laboratories, Inc., New York, N.Y., a corporation of New York
No Drawing. Filed Mar. 6, 1958, Ser. No. 719,506
2 Claims. (Cl. 99—2)

This invention relates to a composition for increasing the growth rate and weight gain of animals and to the method of using the composition for such purpose.

It is known that piperazine and its salts and derivatives are effective anthelmintic agents when ingested at relatively high dosages, due to the fact that the piperazine content inherently exerts such action. In particular, it is set forth in my copending application Serial No. 494,820, filed March 16, 1955 (now Patent No. 2,850,426, granted September 2, 1958), that piperazine phosphate is a superior piperazine derivative or salt and has excellent anthelmintic and ascaricidal action when administered at suitable dosage levels. Piperazine phosphate has low or little toxicity and hence can be utilized at a high enough dosage level to obtain effective anthelmintic action safely. The normal and acceptable level for effective ascaricidal and anthelmintic action is 4 to 14 pounds per ton of animal feed.

It has now been found that the combination of piperazine phosphate with the usual feed of animals at sub-ascaricidal and sub-anthelmintic levels has surprising and unexpected results in increasing the growth rate and weight gain of the animals and in bringing about more efficient conversion of the feed into weight gain. These highly desirable but heretofore unobtained results can be secured by means of the present invention.

Piperazine phosphate, its production and characteristics, has been described in my aforesaid copending application. It is a white powder which is only very slightly soluble in water with a pH of 6.5. It has the formula $C_4H_{10}N_2 \cdot H_3PO_4$ and is prepared by combining aqueous solutions of equi-molecular quantities of piperazine or its hexahydrate with phosphoric acid $H_3PO_4$. The reaction product readily forms without any special reaction conditions and is easily recovered as by filtration.

In accordance with the present invention, piperazine phosphate is admixed and combined with any of the usual animal feeds in such amount that it is present in the feed to the extent of 200 to 1500 grams per ton, preferably approximately 400 grams per ton. The lower limit of 200 grams per ton has been found to be of critical significance because, while some minor deviation therefrom is permissible, amounts materially less than 200 grams per ton have been determined to be inadequate. The upper limit is well below the minimum amount used for ascaricidal and anthelmintic action. Approximately 400 grams (less than 1 pound) per ton has been found to be best when all factors are considered and is thus preferred. This represents less than one-fourth of the minimum effective ascaricidal and anthelmintic dosage of 4 pounds per ton.

The administration of piperazine phosphate in animal feed in the dosages of 200 to 1500 grams per ton exerts its new low level action not as a result of any ascaricidal or anthelmintic action, but through greater feed consumption and improved appetite in conjunction with more efficient feed utilization and conversion of feed to rate of growth and weight gain. This is the case because the level of piperazine phosphate is insufficient to kill or expel any substantial number or percentage of worms, helminths or ascarids.

Tests were carried out on weanling pigs fed with a basal ration as a control group and with the same basal ration with which piperazine phosphate was combined in the proportion of 20 grams of piperazine phosphate per 100 pounds of feed. The basal ration consisted, depending upon the body weight of the pigs, of 77 to 84% ground yellow corn, 20 to 13% soybean oil meal, and minor percentages (0.05% to 1.0%) of ground limestone, steamed bone meal, iodized salt, trace minerals, vitamin supplement (2–49 C Lederle) and antibiotic supplement (TM-10 Pfizer), all percentages being by weight. The control weanling pigs fed the basal ration showed an average daily weight gain, from the average initial weight of 25.9 pounds to the average final market weight of 185.7 pounds, of 1.57 pounds whereas the pigs fed the basal ration plus 20 grams of piperazine phosphate per 100 pounds of feed showed an average daily weight gain of 1.69 pounds and a final average market weight of 197.5 pounds even though the average initial weight was 25.6 pounds. The control group of pigs consumed on the average 4.71 pounds of feed daily whereas the pigs fed the basal ration plus the piperazine phosphate (20 grams per 100 pounds of feed) consumed on the average 5.20 pounds of feed daily.

The tests were conducted during a period of 102 days. In a similar test run for 92 days, using pigs with an average initial weight of approximately 41 pounds, the average daily weight gain was 1.46 pounds for pigs fed the basal ration and 1.54 pounds for pigs fed the basal ration plus piperazine phosphate (20 grams per 100 pounds of feed); similarly, the pigs fed the basal ration consumed on the average 4.96 pounds of feed daily while those fed the basal ration plus piperazine phosphate (20 grams per 100 pounds of feed) consumed on the average 5.26 pounds of feed daily. The market weight of the first group averaged 175.6 pounds and that of the second group 182.1 pounds. Intestinal examination showed that the low level dosage of piperazine phosphate effected some but not a significant reduction in the number of ascarids (*Ascaris lumbricoides*) as compared with the control animals so that the results were not due to ascaricidal action.

The foregoing tests on pigs are illustrative and exemplary and do not constitute a limitation on the invention which is applicable to other domesticated and barnyard animals, including horses, cattle, sheep, poultry, canines and felines. The invention is also not limited to any particular feed, such as the basal pig ration mentioned above, because piperazine phosphate in the indicated range can be combined with any conventional or desired solid feed or mash customarily used for the particular animal involved. The tests above set forth also demonstrate that the presence of the piperazine phosphate in the feed was in no way objectionable to the animals as to taste, odor or digestibility.

The invention is defined by the appended claims.

What is claimed is:

1. A growth promoting composition comprising an edible carrier containing piperazine phosphate in an amount of from about 200 to 1500 grams per ton of the carrier.

2. A growth promoting composition comprising an edible carrier containing approximately 400 grams of piperazine phosphate per ton of the carrier.

References Cited in the file of this patent

UNITED STATES PATENTS

| | | |
|---|---|---|
| 2,831,795 | Hymas | Apr. 22, 1958 |
| 2,850,426 | Hereld | Sept. 2, 1958 |
| 2,856,328 | Terry | Oct. 14, 1958 |

OTHER REFERENCES

Wallace et al.: Mimeograph Series No. 58-6, January 20, 1958, Florida Agr. Expt. Sta., Gainesville, Florida.
Guthrie et al.: Journal Animal Sc. 16, November 1957.